Sept. 5, 1961 | A. L. FERRIS | 2,998,918

FULL ADDER

Filed Jan. 2, 1958 | 3 Sheets-Sheet 1

INVENTOR.
ARTHUR L. FERRIS

BY Dewey J. Cunningham

ATTORNEY

Sept. 5, 1961 A. L. FERRIS 2,998,918

FULL ADDER

Filed Jan. 2, 1958 3 Sheets-Sheet 2

Sept. 5, 1961 A. L. FERRIS 2,998,918

FULL ADDER

Filed Jan. 2, 1958 3 Sheets-Sheet 3

2,998,918

FULL ADDER

Arthur L. Ferris, Syracuse, N.Y., assignor to International Business Machines Corporation, New York, N.Y., a corporation of New York Filed Jan. 2, 1958, Ser. No. 706,839
4 Claims. (Cl. 235—176)

The present invention relates to signal translating apparatus and particularly to an arrangement for serially adding two binary numbers to produce a sum with a minimum of delay.

Digital computers include in their arithmetic section one or more arrangements for adding signals representing two binary numbers and producing an output signal representing the sum thereof. The conventional technique for serial addition is to utilize a full adder which is connected to receive the two numbers to be added and to produce sum and carry output signals. The carry output signal is delayed for one digit time and supplied back to the input of the full adder to serve as the third input thereto.

The present invention produces the final result accomplished by conventional adders but by an entirely different means which operate on a new principle. Accordingly, it is a principal object of this invention to provide a new and improved arrangement for adding signals representing two binary numbers and producing an output signal representative of the sum thereof.

Another object of this invention is to furnish a new and improved adder arrangement for two binary numbers which requires only a two channel input circuit.

Still another object of the invention is to furnish a new and improved adder arrangement which introduces a minimum of delay between the input and output.

Other objects of the invention will be pointed out in the following description and claims and illustrated in the accompanying drawings, which disclose, by way of examples, the principle of the invention and the best mode, which has been contemplated, of applying that principle.

Figure 3A:
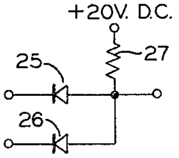
Figure 3B:
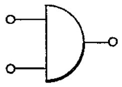
Figure 4A:
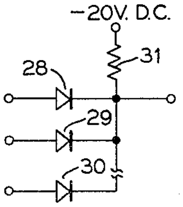
Figure 4B:
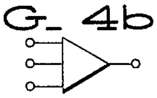
Figure 5A:
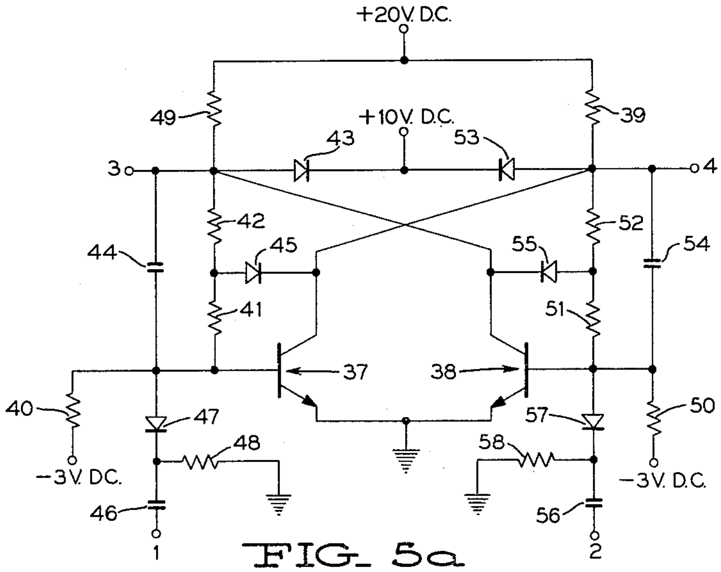
Figure 5B:
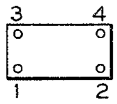

FIG. 3*a* shows the schematic details of a typical logical OR circuit which is illustrated in block form as shown in FIG. 3*b*;

FIG. 4*a* shows the schematic details of a typical logical AND circuit which is illustrated in a block form as shown in FIG. 4*b*; and FIG. 5*a* shows the schematic details of a typical trigger circuit which is illustrated in block form as shown in FIG. 5*b*.

Briefly, the present invention utilizes first and second bistable devices for respectively receiving and storing signals representing successive digits of first and second binary numbers to be added. The signals are stored only during the digit time. A first gate is connected to said first and second bistable devices for detecting a condition where a binary 1 is in a digit position of each of the first and second numbers, and a second gate is connected to said first and second bistable devices for detecting a condition where a binary 0 is in a digit position of each of the first and second binary numbers. The first and second gates are examined each digit time and a bistable device is turned On by an output of the first gate and Off by an output of the second gate. Once the bistable device is turned On it will remain in this condition until it is turned Off. It will remain Off until turned On again, and etc. The condition of the last-mentioned bistable device is examined each digit time and utilized to control another bistable device which in effect carries the same information as the previous bistable device except that it is delayed by one digit time. A further bistable device, which is reset Off each digit time, is turned On if there is an output from either of the first or second gates. These last two bistable devices have their outputs cross-coupled to a pair of gates which are sampled each digit time. The outputs of this pair of gates are supplied to a mixing circuit whose output represents the sum of the two binary numbers, said sum being delayed by approximately one digit time from the signals representing the two binary numbers which are added.

Figure 1:
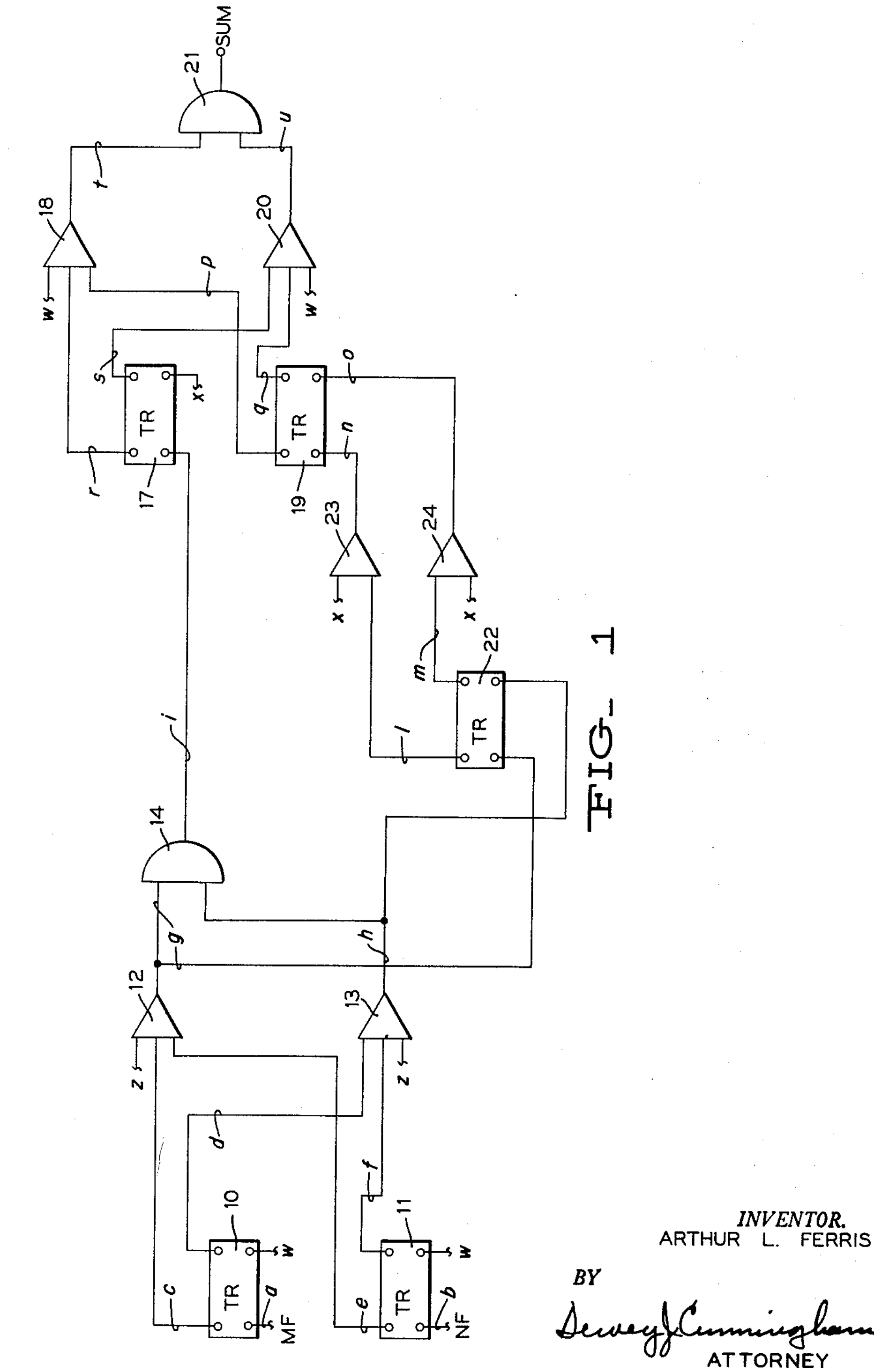
FIG. 1 is a detail block diagram of the present invention.

Before getting into a detailed description of the invention as illustrated in FIG. 1, typical circuits which may be used in the boxes of FIG. 1 will be described. While specific detailed circuits are shown, it will be apparent that the present invention may utilize many other types of circuits for performing a similar function.

FIG. 3*a* shows a schematic diagram of a logical OR circuit for negative pulses, the block form of this circuit being shown in FIG. 3*b*. The cathodes of diodes 25 and 26 are connected to respective input terminals to which signals having one or the other of two levels are adapted to be applied. The plates of the diodes are commoned and connected to one end of a resistor 27, the other end of said resistor being connected to a voltage which is more positive than the most positive level of the input signal. The operation of the circuit is such that the output signal taken from the commoned plates of the diodes will follow the most negative level of the input signals.

FIG. 4*a* shows a schematic diagram of a logical AND circuit for negative pulses, the block form of this circuit being shown in FIG. 4*b*. This circuit is also known as a switch or a gate. The plates of diodes 28, 29, and 30 are connected to respective input terminals and the cathodes of these diodes are commoned and connected to one end of a resistor 31, the other end of said resistor being connected to a negative source of D.C. potential. The output may be taken from the commoned cathodes at a suitable terminal. The output signal from this circuit follows the most positive input signal supplied to the plates of the diodes. The circuit is normally used for supplying a negative output signal in response to a condition where all of the input signals are relatively negative. If any one of the input signals is relatively positive, then the output signal will also be relatively positive.

FIG. 5*a* shows the schematic details of a trigger circuit which is shown in block form in FIG. 5*b*. This trigger is comprised of a pair of NPN transistors illustrated by reference numerals 37 and 38, each of which is connected in a grounded emitter configuration. Transistor 37 has its collector connected through a resistor 39 to a positive source of D.C. potential. The base of transistor 37 is connected through a resistor 40 to a negative source of D.C. potential, said base being connected through resistors 41 and 42 to the collector of transistor 38, said collector being connected by way of diode 43 to a positive source of D.C. potential. A bypass condenser 44 is connected in parallel with resistors 41 and 42. A clamp diode 45 is provided between the junction of resistors 41 and 42 and the collector of transistor 37. The input signals of transistor 37 is adapted to be supplied to terminal 1 which is coupled by a capacitor 46 and a diode 47 to the base of the transistor, there being a resistor 48 connected between capacitor 46 and diode 47 and ground potential. Transistor 38 has its collector connected by way of a resistor 49 to a source of positive D.C. potential. The base of transistor 38 is connected by way of resistor 50 to a negative source of D.C. potential and through resistors 51 and 52 to the collector of transistor 37. The last-mentioned collector is connected by way of a diode 53 to a positive source of D.C. potential. Bypass condenser 54 is provided in parallel with resistors 51 and 52. The input to transistor 38 is supplied to terminal 2 which is coupled by a capacitor 56 and a diode 57 to the base of transistor 38, the junction between capacitor 56 and diode 57 being connected to ground by way of resistor 58.

For the purposes of this description, the trigger will be considered Off when transistor 37 is conducting and transistor 38 is at cut-off. With transistor 37 conducting, the collector thereof will be at substantially ground potential and will thereby hold the base of transistor 38 sufficiently negative to maintain it at cut off. Therefore, the output voltage in terminal 4 will be in substantially ground while the output voltage in terminal 3 will be at substantially +10 volts. It will be seen that with transistor 38 at cut-off, the collector thereof will attempt to go to the +20 volt D.C. but will be prevented therefrom due to the connection of the output terminal 3 by way of diode 43 to the +10 volt D.C. Thus, output terminal 3 cannot go above +10 volts D.C. A negative input signal to terminal 1 is utilized to turn the trigger On. This input signal drops the voltage at the base of transistor 37 which causes the transistor to go toward cut-off, thereby allowing the collector voltage thereof to rise to +10 volts. When this occurs, the base of transistor 38 will be raised in potential and allow the transistor to go into conduction. This causes the collector of transistor 38 to drop in potential and thereby hold transistor 37 biased to cut-off. Under these circumstances, i.e. with trigger On, the voltage of terminal 3 will be at substantially ground while the voltage of terminal 4 will be at +10 volts D.C.

The trigger may be reset Off by supplying a negative impulse to terminal 2 which causes transistor 38 to go out of conduction which, in going out of conduction, causes transistor 37 to go into conduction. This, of course, reverses the potentials at output terminals 3 and 4.

Figure 2:
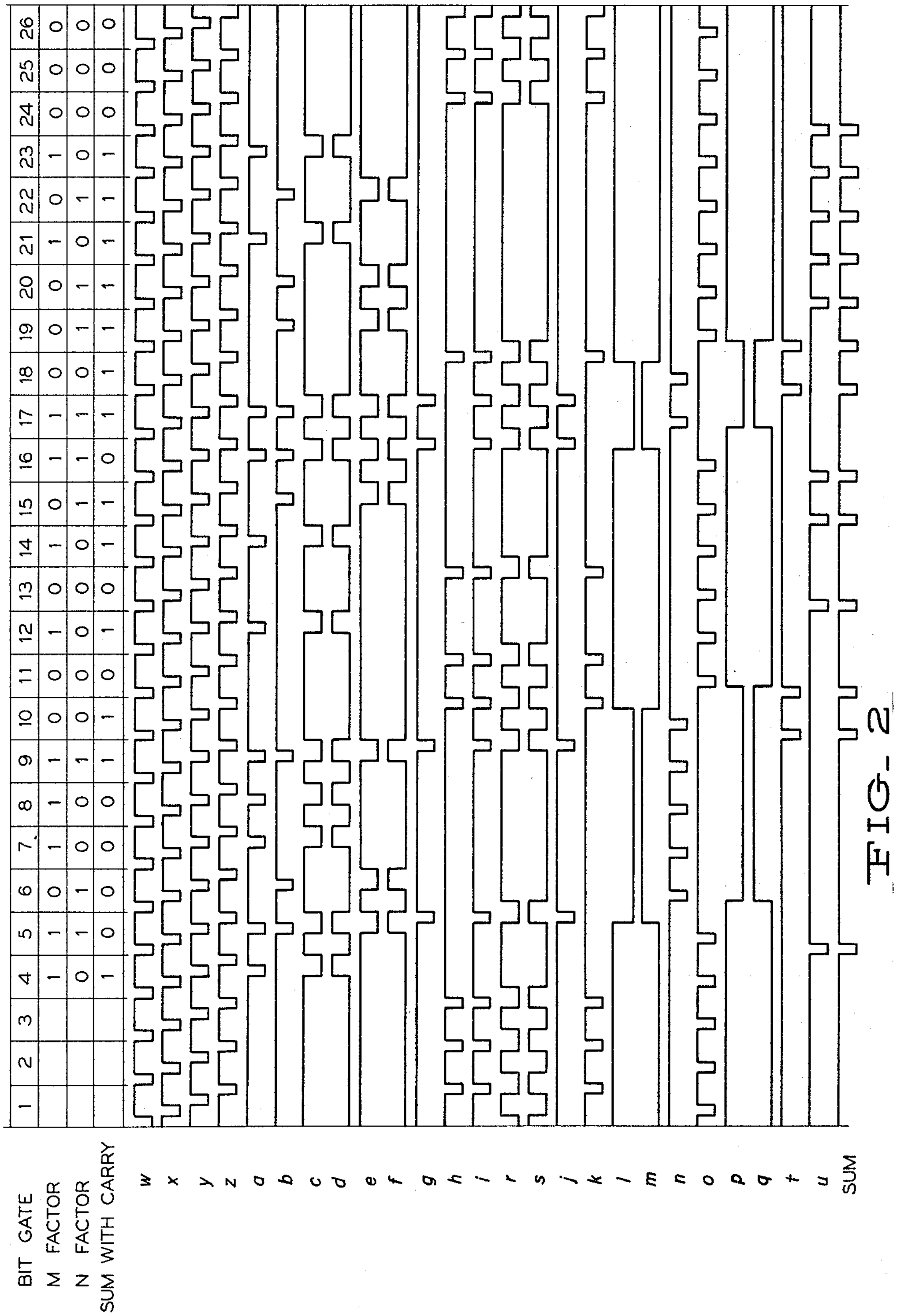
FIG. 2 is a timing diagram which may be utilized to show the signal conditions at various points in the circuit of FIG. 1 for a particular pair of binary numbers to be added.

Referring to FIG. 2, the two binary numbers identified as the M FACTOR and the N FACTOR are sample numbers to be added. These numbers have a digit position for each of the bit gate intervals 4 through 23, i.e. BG4–BG23. While the bit gate pulses are not shown, their use is well known in computer technology. Basically, a relatively negative signal is available during a major portion of each of the bit gate intervals. These bit gate signals may be successively produced by any suitable timing gate generator. Signals representing the M FACTOR and the N FACTOR are in the form of a series of negative pulses representing a binary 1 and the absence of a negative pulse representing a binary 0.

It will be seen that $w$, $x$, $y$, $z$ clock pulses are supplied during each bit gate interval. The pulses representing a binary 1 in a particular digit position occur at $y$ time.

The waveforms shown in FIG. 2 labeled by the lower case letters $a$ through $u$ appear at similarly labeled points in the circuit of FIG. 1 for the particular M FACTOR and N FACTOR to be added as shown in FIG. 2.

It will be noted that the first 3 bit gates in the M FACTOR and N FACTOR do not contain information in the example given. Actually, the first 2 bit gate intervals may be used for switching operations and the third bit gate interval may be used for the sign of each factor. The sign of the number could be used, for example, to cause one of the numbers to be complemented so as to perform subtraction by addition of complements. Inasmuch as this practice is well known, the present invention will deal only with the actual numerical information contained in digit positions 4 through 23.

Referring now to FIG. 1, there is illustrated a trigger 10 connected to receive signals representing the M FACTOR and a trigger 11 connected to receive signals representing the N FACTOR. Each of these triggers are reset at $w$ time. Thus, with each of the triggers reset Off, the output from the left side thereof is relatively positive and the output from the right side will be relatively negative. A gate or logical AND circuit 12 is connected to receive the outputs from the left sides of triggers 10 and 11 while AND circuit 13 is connected to receive the outputs from the right sides of triggers 10 and 11. The $z$ clock pulses are supplied to each of AND circuits 12 and 13. Thus, if each of triggers 10 and 11 are OFF at $z$ time, an output signal will be supplied from AND circuit 13. If each of triggers 10 and 11 is On at $z$ time, an output signal will be supplied from AND circuit 12. An output signal from circuit 13 indicates a binary 0 in each digit position of the M FACTOR and N FACTOR for a particular bit gate time while an output signal from circuit 12 indicates a binary 1 in each digit position of the M FACTOR and N FACTOR for a particular bit gate time. However, if a particular digit position of both the M FACTOR and N FACTOR do not have the same binary value, no outputs are supplied from circuits 12 and 13 at $z$ time.

An OR circuit 14 is connected to pass either of the outputs of AND circuits 12 and 13 to turn a trigger 17 On, said trigger having been previously reset Off at $x$ time. A trigger 19 is also provided. The outputs from the left sides of triggers 17 and 19 are supplied to AND circuit 18 and the outputs from the right sides of triggers 17 and 19 are supplied to AND circuit 20. Circuits 18 and 20 are each sampled at $w$ time and if all of the inputs to one of the circuits are relatively negative an output will be supplied through OR circuit 21 which is representative of the Sum at a particular digit position of the M FACTOR and the N FACTOR.

By way of example, suppose that at a particular digit position two binary 1's or two binary 0's are being received by triggers 10 and 11. Under these circumstances an output will be supplied from one of circuits 12 and 13 and cause trigger 17 to be set at $z$ time. Thus, the outputs from trigger 17 will be relatively negative to AND circuit 18 and relatively positive to AND circuit 20. Assuming that the two digits being added are the first two digits of the number, trigger 19 will be Off and will therefore supply a relatively positive voltage to AND circuit 18 and a relatively negative voltage to AND circuit 20. Since neither of these AND circuits will have all the inputs thereto relatively negative at $w$ time, the output will be the absence of a pulse which is the equivalent of a binary 0. It will be apparent that this is the correct answer since the addition of two binary 1's or two binary 0's should give a binary 0 for that particular digit position in the output.

If on the other hand, a binary 1 and a binary 0 are supplied to triggers 10 and 11, trigger 17 will not be turned On. At $w$ time all of the inputs to AND circuit 20 will be relatively negative in coincidence and result in a pulse representing a binary 1. This is correct since the addition of a binary 1 and a binary 0 is equal to a binary 1.

To this point the detailed description has only been concerned with the addition of two binary digits. It will be seen that where the M FACTOR and N FACTOR each contained multiple digits a problem of carry from one digit position to the next arises. Reference is made to the following addition of two binary numbers.

| | |
|---|---|
| M FACTOR | 01010001101010011011 |
| N FACTOR | 00101101110000100110 |
| Sum without carry | 01111100011010011101 |
| Carry | 1 1   1   1   1 |
| Sum with carry | 01111111011010110000 1 |

In examining the low order digits in the above example (the lowest order being on the right), it will be seen that the digits remained the same in both the sum with carry and the sum without carry, up to and including the digit position where a binary 1 appears in both the M and N FACTORS. After this position, the corresponding digits in the sum with carry are the inverse of the digits in the sum without carry up to and including the first point where a binary 0 appears in the same digit position in both the M and N FACTORS. This can be explained by the fact that there is a carry into each higher position until there is the addition of the binary 1 carry and a pair of binary 0's. The process now repeates itself yielding inverse digits after the next pair of 1's and corresponding digits after the following pair of 0's.

The present invention utilizes this principle in handling the carry problem in a fashion now to be described. A trigger 22 is furnished to receive its inputs from AND circuits or switches 12 and 13. The arrangement is such that a negative pulse from switch 12 will turn trigger 22 On and a negative pulse from switch 13 will turn the trigger Off. Thus, if a binary 1 appears in the same digit position of the M and N FACTORS, trigger 22 will be turned On at *z* time and if a binary 0 appears in the same digit position of the M and N FACTORS, trigger 22 will be turned Off at *z* time. Of course, it will be realized that if trigger 22 is already in the condition to which the input signal is attempting to place it, no change occurs.

If trigger 22 is On, at the next *x* time a switch 23 connected to the left side of trigger 22 will supply a negative output signal to turn trigger 19 On, providing it is not already On. If trigger 22 is Off at the said next *x* time a switch 24 connected to the right side of trigger 22 will supply a negative output signal to turn trigger 19 Off, unless, of course, it is already Off.

From the above, it will be seen that during the digit time a binary 1 appears in both the M and N FACTORS trigger 22 will be turned On and will remain On until a binary 0 appears in both the M and N FACTORS. Trigger 19 follows the action of trigger 22 except that it is always delayed by one-half of a bit gate interval. This is due to the fact that the input to trigger 22 occurs at *z* time during one bit gate interval and the input to trigger 19 occurs at *x* time of the next bit gate interval.

When a binary 0 appears in both the M and N FACTORS for the first time following the appearance of a binary 1 in both the M and N FACTORS, AND circuit 13 will supply an output at *z* time to turn trigger 22 Off. At the next *x* time, the relatively negative output from trigger 22 to AND circuit 24 is sampled and produces an input to trigger 19 which turns it Off.

Referring again to trigger 17, it will be seen that this trigger is turned On only when there is a binary 1 or a binary 0 in a particular digit position in both the M FACTOR and N FACTOR. When trigger 17 is in an On condition, AND circuit 20 will be inhibited from producing a negative output pulse at *w* time. Whether AND circuit 18 can produce a negative pulse at *w* time depends on the condition of trigger 19. If trigger 19 is On, AND circuit 18 is not inhibited. If the trigger is Off, however, trigger 18 will be inhibited so that OR circuit 21 will produce a binary 0 in the output.

Referring to FIG. 2, sample M and N FACTORS are given. At BG4 time a binary 1 appears in the M FACTOR and a binary 0 in the N FACTOR. This should result in a binary 1 at the output at *w* time of BG5. It will be seen that this is the case since with triggers 17 and 19 both Off, AND circuit 20 produces a negative pulse at *w* time of BG5. At the following *y* time, a binary 1 appears in both the M and N FACTORS, thereby turning On each of trigger 17 and 22 at the following *z* time. At *w* time of BG6, trigger 17 is still On so that both of the AND circuits 18 and 20 are inhibited, thereby producing a binary 0 at the output. At *x* time of BG6, trigger 17 is turned Off and AND circuit 23 detects the On condition of trigger 22 and turns trigger 19 On. At *w* time of BG7 each of AND circuits 18 and 20 are inhibited so that a binary 0 is produced as an output from OR circuit 21.

Trigger 17 remains Off until *z* time of the bit gate interval during which the M FACTOR and the N FACTOR each have a binary 1 therein or each have a binary 0 therein. Trigger 19 remains in an On condition until *x* time of the following bit gate interval providing binary 0's occur simultaneously in the M and N FACTORS. Referring to FIG. 2, it is seen that at *y* time of BG9, a binary 1 is entered into each of the triggers 10 and 11. At the following *z* time trigger 17 is turned On. At *w* time of BG10, a negative pulse is produced from AND circuit 18 and OR circuit 21, thereby indicating a binary 1 in the Sum. At the following *y* time a binary 0 appears in each of the M and N FACTORS. This means that trigger 17 will again be turned On. However, trigger 22 will be turned Off. Thus, at *w* time of BG11, a binary 1 again appears out of the OR circuit 21 as a result of a negative pulse from AND circuit 18. At *x* time, the Off condition of trigger 22 is detected by AND circuit 24 and trigger 19 is turned Off.

During *y* time of BG11, trigger 17 is again turned On. However, with trigger 19 Off, each of the AND circuits 18 and 20 will be inhibited at *w* time with BG12, resulting in a binary 0 at the output.

From the above detailed description to this point, it is believed that the remainder of FIG. 2 will be obvious. It is considered that no further explanation of the detailed operation of the present invention is required.

While there have been shown and described and pointed out the fundamental features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A full adder for receiving signals representing two binary numbers and producing signals representing the sum thereof at an output terminal, each of said binary numbers having a plurality of digits, each digit having a binary value of 1 or 0, a binary value of 1 being represented by a first signal condition and a binary value of 0 being represented by a second signal condition, the signals for said binary values being supplied to the adder in serial form lower order first, the signals for successive digit positions of each number occurring during successive digit times, means responsive to the occurrence of said first signal condition in the same digit of each of said binary numbers for producing a first output signal and responsive to the occurrence of said second signal condition in the same digit of each of said binary numbers for producing a second output signal, first and second bistable means, said first bistable means being connected to the first-mentioned means and responsive to either said first output signal or said second output signal for being set to a predetermined one of its stable states, said second bistable means being connected to said first-mentioned means and responsive to said first output signal for being set to a predetermined one of its stable states and responsive to said second output signal for being set to the other of its stable states, third bistable means, means connecting said second bistable means and said third bistable means for placing said third bistable means in the stable state during one digit time that said second bistable means was in the previous digit time, and means for interrogating said first and third bistable means each digit time and supplying an output signal to said output terminal when they are in the same stable state.

2. A full adder for receiving manifestations of two binary numbers in serial fashion and producing the sum thereof at an output terminal, the manifestation for each binary number being in the form of a voltage at a first level to represent a binary 1 in a particular digit position and a voltage at a second level to represent a binary 0 in said digit position, a first gate responsive to said first voltage level in the same position of said binary numbers for producing a first output signal, a second gate responsive to said second voltage level in the same digit position of said binary numbers for producing a second output signal, first bistable means connected to receive said first or second output signals and responsive to either for being set to one of its stable states for a predetermined interval, second bistable means connected to said first and second gates and respectively responsive to the output signals therefrom for being set to one or the other of its stable states, means connected to said second bistable device for periodically interrogating the condition thereof, third bistable means connected to the last-named means for being set to one of its stable states if said second bistable means is in said one stable state and to the other of its stable states if said second bistable means is in said other stable state, and means responsive to a predetermined relationship between the stable states of said first and third bistable means for producing an output signal at said output terminal.

3. A full adder comprising first and second bistable devices respectively connected to receive signals representing the binary values for successive digit positions of first and second digit positions of first and second binary numbers, each bistable device being in one of its stable states when the binary value supplied thereto is 1 and in the other of its stable states when the binary value supplied thereto is 0, first and second gates each connected to said first and second bistable means, said first gate producing a first output signal when said first and second bistable devices are each in said one stable state and said second gate producing a second output signal when said first and second bistable devices are in said other stable state, a third bistable device connected to said first and second gates which is settable to one of its stable states by said first output signal and to the other of its stable states by said second output signal, a fourth bistable device connected to said first and second gates and settable to one of its stable states in response to either said first or second output signals, said fourth bistable device being reset to its other stable state before the next possible occurrence of said first and second output signals, a fifth bistable device connected to said third bistable device by means which place said fifth bistable device is the same stable state as said third bistable device was in during a preceding digit time, and means connected to each of said fourth and fifth bistable devices and responsive to a particular relationship existing between the stable states thereof for producing an output signal.

4. An adder comprising first and second storage means respectively connected to receive signals representing binary values for successive digit positions of first and second binary numbers, means connected to said first and second storage means for producing a first output signal when said first and second storage means are each storing a first binary value and for producing a second output signal when said first and second storage means are each storing a second binary value, first and second bistable means, each of said first and second bistable means having a pair of output conductors, said first bistable means being connected to receive said first and second output signals in a manner such that either will place the first bistable means in a predetermined one of its bistable states, a circuit means connecting the first named means to said second bistable means in a fashion such that said second bistable means will assume one of its stable states a digit time following said first output signal and will assume the other of its stable states a digit time following the occurrence of said second output signal, first and second coincidence gates, the output conductors of said first and second bistable means being cross-coupled to said first and second concidence gates, the output conductors of said bistable devices leading to said first coincidence gate being concurrently energized in the same direction when both of said bistable means are in one of their stable states, the output conductors of said bistable devices leading to said second coincidence gate being concurrently energized in the same direction when both of said bistable means are in the other of their stable states, a mixing circuit, means interconnecting said coincidence gates with said mixing circuit, and means to periodically sample the condition of said coincidence gates each digit time whereby said mixing circuit produces an output signal when either of said coincidence gates are enabled.

References Cited in the file of this patent

UNITED STATES PATENTS

| | | |
|---|---|---|
| 2,643,820 | Williams et al. | June 30, 1953 |
| 2,724,780 | Harris | Nov. 22, 1955 |
| 2,851,219 | Hussey | Sept. 9, 1958 |

OTHER REFERENCES

Williams et al.: "Universal High-Speed Digital Computers: Serial Computing Circuits," Proc. Inst. Electrical Engineers (British), April 1952, page 112.